United States Patent
Wang et al.

(12)

(10) Patent No.: US 6,844,071 B1
(45) Date of Patent: Jan. 18, 2005

(54) MULTILAYER ARTICLES COMPRISING POLYCARBONATE AND POLYPROPYLENE AND METHOD FOR THEIR PREPARATION

(75) Inventors: Hua Wang, Clifton Park, NY (US); Glen Robert Tryson, Malden Bridge, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/681,760

(22) Filed: Oct. 6, 2003

(51) Int. Cl.⁷ .................................................. B32B 27/36
(52) U.S. Cl. ..................... 428/412; 264/176.1; 264/219
(58) Field of Search ............................. 264/176.1, 219; 428/412

(56) References Cited

U.S. PATENT DOCUMENTS

| | | | |
|---|---|---|---|
| 2,991,273 A | 7/1961 | Hechelhammer et al. |
| 2,999,835 A | 9/1961 | Goldberg et al. |
| 3,028,365 A | 4/1962 | Schnell et al. |
| 3,148,172 A | 9/1964 | Fox |
| 3,153,008 A | 10/1964 | Fox |
| 3,271,367 A | 9/1966 | Schnell et al. |
| 3,271,368 A | 9/1966 | Goldberg et al. |
| 3,965,057 A | 6/1976 | Ammons et al. |
| 4,217,438 A | 8/1980 | Brunelle et al. |
| 4,503,121 A | 3/1985 | Robeson et al. |
| 4,576,842 A | 3/1986 | Hartsing et al. |
| 4,608,417 A | * 8/1986 | Giles, Jr. ..................... 525/148 |
| 4,643,937 A | 2/1987 | Dickinson et al. |
| 4,931,364 A | 6/1990 | Dickinson |
| 4,992,322 A | 2/1991 | Curry et al. |
| 5,001,000 A | 3/1991 | Rohrbacher et al. |
| 5,030,505 A | 7/1991 | Dickinson |
| 6,306,507 B1 | 10/2001 | Brunelle et al. |
| 6,538,065 B1 | 3/2003 | Suriano et al. |
| 6,572,956 B1 | 6/2003 | Pickett et al. |
| 2002/0182352 A1 | 12/2002 | Mitten et al. |
| 2003/0175488 A1 | 9/2003 | Asthana et al. |

OTHER PUBLICATIONS

Application Ser. No. 10/461,005, filed Jun. 12, 2003.
Application Ser. No. 10/371,754, filed Feb. 21, 2003.
Application Ser. No. 10/371,755, filed Feb. 21, 2003.

* cited by examiner

*Primary Examiner*—Terressa Boykin
(74) *Attorney, Agent, or Firm*—Andrew J. Caruso; Patrick K. Patnode

(57) ABSTRACT

Disclosed are multilayer articles comprising (i) at least one polycarbonate layer, wherein the polycarbonate comprises structural units derived from at least one dihydroxy aromatic hydrocarbon; (ii) at least one polypropylene layer; and (iii) a tielayer between the polycarbonate layer and the polypropylene layer, wherein the tielayer comprises a copolymer with structural units derived from at least one alkenyl aromatic compound and at least one conjugated diene. Also disclosed are film pre-assemblies comprising a tielayer and either a polycarbonate or a polypropylene layer. Methods to make articles and pre-assemblies are also disclosed.

49 Claims, No Drawings

MULTILAYER ARTICLES COMPRISING POLYCARBONATE AND POLYPROPYLENE AND METHOD FOR THEIR PREPARATION

BACKGROUND OF THE INVENTION

The present invention relates to multilayer articles and their preparation. More particularly, it relates to multilayer articles comprising at least one polycarbonate layer, at least one polypropylene layer and at least one adhesive tielayer between the polycarbonate layer and the polypropylene layer.

The use of multilayer compositions for containers such as bottles, jars and the like, and packaging materials for storing food, beverages, and other perishable items has been known for quite some time. The advantage of using a multilayer structure is that the beneficial properties of two or more materials may be combined with the structural integrity of each material being essentially uncompromised. Usually the advantageous and positive properties of one material off-set or counter-balance the weaker properties of the second material. Thus, polycarbonate and polypropylene offer an attractive combination of properties which neither polymer can provide alone in a formed article. For example, polycarbonate resins exhibit advantageous properties of excellent impact strength, high heat resistance, gloss, and transparency. Polycarbonate resins also exhibit much better resistance to staining in food storage containers than does polypropylene. On the other hand, polypropylene offers better sound damping characteristics and is also less expensive than polycarbonate. Therefore, a multilayer article combining properties of a polycarbonate layer and a polypropylene layer is highly desirable.

To maintain structural integrity in formed, multilayer articles, polycarbonate and polypropylene layers must efficiently adhere to each other. However, highly polar polycarbonates have virtually no adhesion to non-polar polypropylene. A problem to be solved is to discover, a tie-layer which has adequate adhesion to both polycarbonate and polypropylene layers. The present inventors have tested many commercially available coextrusion tie-layers for such applications and found that they provided inadequate adhesion between polycarbonate and polypropylene layers. Also multilayer articles comprising polycarbonate and polypropylene layers joined by various tielayers were found to emit gas bubbles during microwave heating, adversely affecting both adhesion between the layers and also the aesthetic appearance of the article. It remains of interest, therefore, to develop a multilayer article comprising polycarbonate and polypropylene layers exhibiting efficient adhesion between the various layers.

SUMMARY OF THE INVENTION

The present inventors have discovered tielayers which provide efficient adhesion between polycarbonate and polypropylene layers in formed, multilayer articles. Multilayer articles comprising polycarbonate and polypropylene layers joined by the tielayers show both high heat capability, hydrolytic stability and stability to microwave heating, thus eliminating the bubbling problem associated with other types of tielayers during microwave heating.

In one of its embodiments the present invention comprises a multilayer article comprising (i) at least one polycarbonate layer, wherein the polycarbonate comprises structural units derived from at least one dihydroxy aromatic hydrocarbon; (ii) at least one polypropylene layer; and (iii) a tielayer between the polycarbonate layer and the polypropylene layer, wherein the tielayer comprises a copolymer with structural units derived from at least one alkenyl aromatic compound and at least one conjugated diene.

In another of its embodiments the present invention comprises film pre-assemblies comprising a tielayer and either a polycarbonate or a polypropylene layer. Methods to make articles and pre-assemblies are also disclosed.

Various other features, aspects, and advantages of the present invention will become more apparent with reference to the following description, examples, and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. As used herein the term "polycarbonate" refers to polycarbonates comprising structural units derived from a carbonate precursor and at least one dihydroxy aromatic hydrocarbon, and includes copolycarbonates. As used herein the term "layer" is used interchangeably with the terms "film" and "sheet".

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples $C_1$–$C_{32}$ alkyl optionally substituted with one or more groups selected from $C_1$–$C_{32}$ alkyl, $C_3$–$C_{15}$ cycloalkyl or aryl; and $C_3$–$C_{15}$ cycloalkyl optionally substituted with one or more groups selected from $C_1$–$C_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include $C_6$–$C_{15}$ aryl optionally substituted with one or more groups selected from $C_1$–$C_{32}$ alkyl, $C_3$–$C_{15}$ cycloalkyl or aryl. Some particular illustrative examples of aryl radicals comprise substituted or unsubstituted phenyl, biphenyl, toluyl and naphthyl.

In embodiments of the invention dihydroxy-substituted aromatic hydrocarbons from which structural units of polycarbonates may be derived comprise those represented by the formula (I):

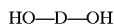 (I)

wherein D is a divalent aromatic radical. In some embodiments, D has the structure of formula (II):

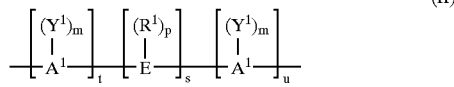 (II)

wherein $A^1$ represents an aromatic group including, but not limited to, phenylene, biphenylene, naphthylene and the like. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene and the like. In other embodiments when E is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, and the like; or a phosphorus-containing linkage including, but not limited to, phosphinyl, phosphonyl, and the like. In other embodiments E may be a cycloaliphatic group including, but not limited to, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, and the like; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^1$ independently at each occurrence comprises a monovalent hydrocarbon group including, but not limited to, alkenyl, allyl, alkyl, aryl, aralkyl, alkaryl, or cycloalkyl. In various embodiments a monovalent hydrocarbon group of $R^1$ may be halogen-substituted, particularly fluoro- or chloro-substituted, for example as in dichloroalkylidene, particularly gem-dichloroalkylidene. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^2$ wherein $R^2$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$–$C_6$ alkyl group. The letter "m" represents any integer from and including zero through the number of replaceable hydrogens on $A^1$ available for substitution; "p" represents an integer from and including zero through the number of replaceable hydrogens on E available for substitution; "t" represents an integer equal to at least one; "s" represents an integer equal to either zero or one; and "u" represents any integer including zero.

In dihydroxy-substituted aromatic hydrocarbons in which D is represented by formula (II) above, when more than one $Y^1$ substituent is present, they may be the same or different. The same holds true for the $R^1$ substituent. Where "s" is zero in formula (II) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons E may be an unsaturated alkylidene group. Suitable dihydroxy-substituted aromatic hydrocarbons of this type include those of the formula (III):

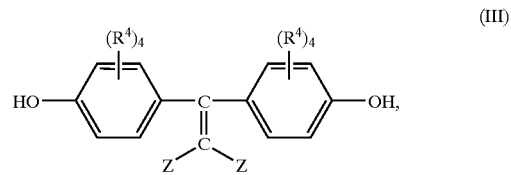 (III)

where independently each $R^4$ is hydrogen, chlorine, bromine or a $C_{1-30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (IV):

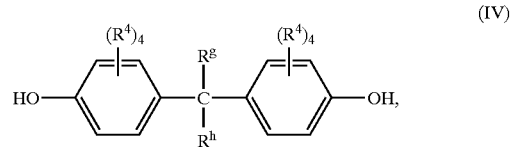 (IV)

where independently each $R^4$ is as defined hereinbefore, and independently $R^g$ and $R^h$ are hydrogen or a $C_{1-30}$ hydrocarbon group.

In some embodiments of the present invention, dihydroxy-substituted aromatic hydrocarbons that may be used comprise those disclosed by name or formula (generic or specific) in U.S. Pat. Nos. 2,991,273, 2,999,835, 3,028,365, 3,148,172, 3,153,008, 3,271,367, 3,271,368, and 4,217,438. In other embodiments of the invention, dihydroxy-substituted aromatic hydrocarbons comprise bis(4-hydroxyphenyl)sulfide, bis(4-hydroxyphenyl) ether, bis(4-hydroxyphenyl)sulfone, bis(4-hydroxyphenyl)sulfoxide, 1,4-dihydroxybenzene, 4,4'-oxydiphenol, 2,2-bis(4-hydroxyphenyl)hexafluoropropane, 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'- dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl) propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl) cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; $C_{1-3}$ alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl) propane; bis(3,5-dimethylphenyl-4-hydroxyphenyl) methane; 1,1-bis(3,5-dimethylphenyl-4-hydroxyphenyl) ethane; 2,2-bis(3,5-dimethylphenyl-4-hydroxyphenyl) propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl)sulfoxide, bis(3,5-dimethyl-4-hydroxyphenyl)sulfone and bis(3,5-dimethylphenyl-4-hydroxyphenyl)sulfide. In a particular embodiment the dihydroxy-substituted aromatic hydrocarbon comprises bisphenol A.

In some embodiments of dihydroxy-substituted aromatic hydrocarbons when E is an alkylene or alkylidene group, said group may be part of one or more fused rings attached to one or more aromatic groups bearing one hydroxy substituent. Suitable dihydroxy-substituted aromatic hydrocarbons of this type include those containing indane structural units such as represented by the formula (V), which compound is 3-(4-hydroxyphenyl)-1,1,3-trimethylindan-5-ol, and by the formula (VI), which compound is 1-(4-hydroxyphenyl)-1,3,3-trimethylindan-5-ol:

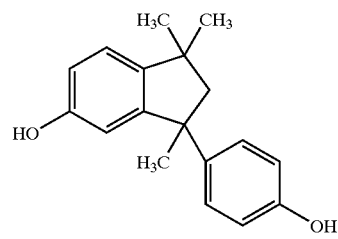

(V)

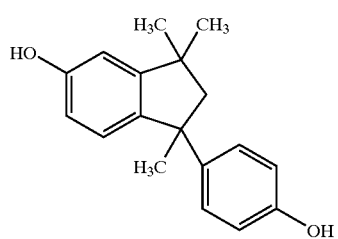

(VI)

Also included among suitable dihydroxy-substituted aromatic hydrocarbons of the type comprising one or more alkylene or alkylidene groups as part of fused rings are the 2,2,2',2'-tetrahydro-1,1'-spirobi[1H-indene]diols having formula (VII):

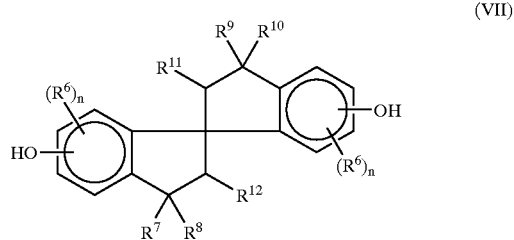

(VII)

wherein each $R^6$ is independently selected from monovalent hydrocarbon radicals and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; and each n is independently selected from positive integers having a value of from 0 to 3 inclusive. In a particular embodiment the 2,2,2',2'-tetrahydro-1,1'-spirobi[1H-indene]diol is 2,2,2',2'-tetrahydro-3,3,3',3'-tetramethyl-1,1'-spirobi[1H-indene]-6,6'-diol (sometimes known as "SBI"). Mixtures comprising at least one of any of the foregoing dihydroxy-substituted aromatic hydrocarbons may also be employed.

Polycarbonates useful in the present invention comprise structural units derived from at least one dihydroxy aromatic hydrocarbon. In various embodiments structural units derived from at least one dihydroxy aromatic hydrocarbon comprise at least about 60 percent of the total number of structural units derived from any dihydroxy hydrocarbon in the polycarbonates, and the balance of structural units derived from any dihydroxy hydrocarbon are aliphatic, alicyclic, or aromatic radicals. In the present invention polyester carbonates are not used as layers in multilayer articles.

Polycarbonates of the invention further comprise structural units derived from at least one carbonate precursor. There is no particular limitation on the carbonate precursor. Phosgene or diphenyl carbonate are frequently used. There is no particular limitation on the method for making suitable polycarbonates. Any known process may be used. In some embodiments an interfacial process or a melt transesterification process may be used.

Generally, any polycarbonate capable of being processed into a film or sheet is suitable for use as the polycarbonate layer in multilayer articles of the invention. In one embodiment the polycarbonate layer comprises at least one homopolycarbonate, wherein the term "homopolycarbonate" refers to a polycarbonate synthesized using only one type of dihydroxy-substituted aromatic hydrocarbon. In particular embodiments the polycarbonate layer comprises a bisphenol A homo- or copolycarbonate, wherein the term "copolycarbonate" refers to a polycarbonate synthesized using more than one type of dihydroxy-substituted hydrocarbon, and in particular more than one type of dihydroxy-substituted aromatic hydrocarbon. In another particular embodiment the polycarbonate layer comprises bisphenol A homopolycarbonate. In other embodiments the polycarbonate layer comprises a blend of at least one first polycarbonate with at least one other polymeric resin, examples of which include, but are not limited to, a second polycarbonate differing from said first polycarbonate either in structural units or in molecular weight or in both these parameters, or a polyester, or an addition polymer such as acrylonitrile-butadiene-styrene copolymer or acrylonitrile-styrene-acrylate copolymer.

In various embodiments the weight average molecular weight of the polycarbonate ranges from about 5,000 to about 100,000 as determined by gel permeation chromatography (GPC). In other embodiments the weight average molecular weight of the polycarbonate ranges from about 25,000 to about 65,000.

The thickness of the polycarbonate layer in the multilayer article is in one embodiment in a range of about 2–2,500 microns, in another embodiment in a range of about 5–2,500 microns, in another embodiment in a range of about 10–2,500 microns, in another embodiment in a range of about 10–1,000 microns, in another embodiment in a range of about 10–600 microns, in another embodiment in a range of about 10–375 microns, in another embodiment in a range of about 20–300 microns, in another embodiment in a range of about 20–250 microns and in another embodiment in a range of about 25–175 microns. In some embodiments of the invention the polycarbonate layer is as thin as possible to minimize cost.

The composition further comprises a polypropylene. In the present context the term "polypropylene" refers to polymers comprising structural units derived from propylene, and includes homopolypropylene and copolymers comprising structural units derived from propylene. In some embodiments the polypropylene may be a copolymer having at least about 70 weight percent, or at least about 80 weight percent, or at least about 90 weight percent of structural units derived from polymerization of propylene.

Examples of polypropylenes suitable for use as layer materials in multilayer articles of the present invention include random, graft, and block copolymers of propylene further comprising up to about 30 weight percent of units derived from $C_2$–$C_{10}$ alpha olefins, including aromatic alpha-olefins. In other embodiments suitable polypropylenes comprise acid- or anhydride-functionalized polypropylenes formed by reaction of the polypropylene with at least one polar functionalization agent selected from the group consisting of a vinyl carboxylic acid or anhydride, acrylic acid, methacrylic acid, maleic acid, maleic anhydride, itaconic acid, itaconic anhydride, fumaric acid, malic acid and monoesters of maleic acid and fumaric acid with monohydric alcohols. It will be understood that in some embodiments both acid and anhydride functionality may exist simultaneously on a polypropylene. In still other embodiments suitable polypropylenes comprise amine-functionalized polypropylenes formed by reaction of acid-functionalized and particularly anhydride-functionalized polypropylenes with a functionalization agent comprising at least one primary or secondary amine group, illustrative examples of which comprise alpha, omega alkylenediamines; hexamethylenediamine; N-alkyl alpha, omega alkylenediamines; N-alkyl alpha, omega ethylenediamines; N-hexylethylenediamine; bis(alpha-aminoalkyl)aromatics; p-xylylene diamine and m-xylylene diamine. Polypropylenes further include blends of the above homopolymers and copolymers. In some embodiments preferred polypropylenes may have a flexural modulus of at least about 100,000 pounds per square inch (689 megapascals) at 23° C. as measured according to ASTM D790. In other embodiments polypropylenes may have a melt flow index of about 0.1 to about 50 g/10 minutes, preferably about 1 to about 30 g/10 minutes when measured according to ASTM DI 238 at 2.16 kg and 200° C.

Preferred polypropylenes are homopolypropylenes. Highly preferred polypropylenes are homopolypropylenes having a crystalline content of at least about 20%, preferably at least about 30%. In another embodiment preferred polypropylenes have a crystallinity content of less than about 90% or less than about 80%.

The thickness of the polypropylene layer is in one embodiment in a range of about 2–2,500 microns, in another embodiment in a range of about 5–2,500 microns, in another embodiment in a range of about 10–2,500 microns, in another embodiment in a range of about 10–1,000 microns, in another embodiment in a range of about 10–600 microns, in another embodiment in a range of about 10–375 microns, in another embodiment in a range of about 20–300 microns, in another embodiment in a range of about 20–250 microns and in another embodiment in a range of about 25–175 microns.

If desired, an overlayer may be included over the polycarbonate or over the polypropylene layer, for example to provide abrasion or scratch resistance. In a particular embodiment a silicone overlayer is provided over a polycarbonate-comprising layer.

In various embodiments tielayers which are suitable for providing adhesion between polycarbonate and polypropylene layers in multilayer articles of the invention comprise copolymers with structural units derived from alkenyl aromatic compound and at least one conjugated diene. In particular embodiments alkenyl aromatic compounds comprise styrene, alpha-methyl styrene, 2-methylstyrene, 3-methylstyrene, 4-methylstyrene, 2-t-butylstyrene, 3-t-butylstyrene, 4-t-butylstyrene, styrenes having from 1 to 5 halogen substituents on the aromatic ring, and the like, and combinations thereof. Conjugated dienes comprise butadiene, isoprene and the like. Such copolymers, and in particular the diene-derived structural units of such copolymers, may be hydrogenated or unhydrogenated. Suitable copolymers comprise those with linear, star, diblock, triblock, multiblock or radial structure. The copolymer comprising an alkenyl aromatic compound and a conjugated diene may be a random copolymer, a partial random copolymer or a block copolymer such as, but not limited to, an A-B, A-B-A or A-B-A-B block copolymer wherein "A" and "B" represent an alkenyl aromatic compound and a conjugated diene block respectively. In some particular embodiments suitable copolymers comprise structural units derived from styrene and at least one conjugated diene, and comprise polystyrene-b-poly(butadiene) copolymer (SB); polystyrene-b-poly(isoprene)-b-polystyrene copolymer (SIS); polystyrene-b-poly(butadiene)-b-polystyrene copolymer (SBS); polystyrene-b-poly(ethylene-propylene)-b-polystyrene copolymer (SEPS); polystyrene-b-poly(ethylene-butylene)-b-polystyrene copolymer (SEBS); and polystyrene-b-poly(ethylene-ethylene/propylene)-b-polystyrene copolymer (SEEPS). Such copolymers may optionally be hydrogenated. Suitable copolymers typically comprise about 10–80 wt. % or 12–70 wt. % or 12–65 wt. % structural units derived from styrene. In a particular embodiment suitable copolymers for tielayers include elastomeric polystyrene-b-poly(styrene-butadiene)-b-polystyrene copolymers (S-S/B-S) which are block copolymers containing a statistical S/B sequence and containing at least about 65 wt. % structural units derived from styrene. Illustrative examples of S-S/B-S block copolymers include STYROFLEX available from BASF Corporation. In a particular embodiment a suitable S-S/B-S block copolymer has a block length ratio of 15:70:15, wherein the S/B mid-block is a statistical or random copolymer of styrene and butadiene. In another particular embodiment a suitable tielayer comprises a blend of an S-S/B-S block copolymer with a polycarbonate or a polypropylene, or a blend of an S-S/B-S block copolymer with both polycarbonate and polypropylene.

In another particular embodiment suitable copolymers for tielayers comprise elastomeric polystyrene-b-poly (isoprene)-b-polystyrene (S-I-S) or hydrogenated S-I-S (hS-I-S) block copolymers wherein the isoprene linkages are primarily 1,2 or 3,4 linkages. Illustrative examples of such copolymers comprise HYBRAR, obtained from Kuraray Co. HYBRAR is a block copolymer comprising polystyrene end blocks and a vinyl-bonded, polyisoprene-rich middle block, optionally hydrogenated. In a preferred embodiment the block comprising polyisoprene units in HYBRAR is hydrogenated. The middle block of HYBRAR is miscible with polypropylene. Usually at least about 50% of the isoprene linkages of S-I-S and hS-I-S copolymers are 1,2 or 3,4 linkages with the remainder of the isoprene linkages being 1,4 linkages. In some particular embodiments about 55% or about 70% of the isoprene linkages of S-I-S or hS-I-S copolymers are 1, 2 or 3,4 linkages. The preferred S-I-S or hS-I-S copolymer comprises greater than about 10% and less than about 30% units derived from styrene with the remainder comprised of polyisoprene units. A particularly preferred S-I-S or hS-I-S copolymer has about 20% units derived from styrene with the remainder comprised of polyisoprene units. In another particular embodiment a suitable tielayer comprises a blend of an S-S/B-S or S-B-S block copolymer with an S-I-S or hS-I-S copolymer.

Suitable copolymers for tielayers also include HYBRAR block copolymers further comprising a thermoplastic polyurethane block. Thus, in a particular embodiment a suitable copolymer for a tielayer comprises a block copolymer comprising a polyester-type thermoplastic polyurethane (TPU) block and a hydrogenated block copolymer comprising polystyrene end blocks and a vinyl bonded, polyisoprene-rich middle block such as, but not limited to, KURAMIRON TU-HM45395 resin, obtained from Kuraray Co.

In other embodiments suitable copolymers with structural units derived from at least one alkenyl aromatic compound and at least one conjugated diene comprise those which have been chemically modified with at least one polar functionalization agent selected from the group consisting of acrylic acid, methacrylic acid, maleic acid, maleic anhydride, itaconic acid, itaconic anhydride, fumaric acid, malic acid and monoesters of maleic acid and fumaric acid with monohydric alcohols. In some embodiments a suitable copolymer is one that has been modified with maleic anhydride. Suitable tielayers typically have a glass transition temperature as measured by DSC of less than about 10° C., or less than about 0° C., or less than about minus 15° C., or less than about minus 20° C., or less than about minus 30° C.

In various embodiments the tielayer thickness may be in a range of between about 8 microns and about 2500 microns; or in a range of between about 25 microns and about 2000 microns; or in a range of between about 50 microns and about 1500 microns; or in a range of between about 100 microns and about 1300 microns; or in a range of between about 500 microns and about 1300 microns. In some other embodiments the tielayer thickness may be in a range of between about 10 microns and about 650 microns; or in a range of between about 10 microns and about 400 microns; or in a range of between about 10 microns and about 250 microns. In some embodiments suitable tielayers may be in the form of film or sheet.

Either the polycarbonate layer or the polypropylene layer or both the polycarbonate layer and the polypropylene layer may comprise other components such as art-recognized additives including, but not limited to, stabilizers, color stabilizers, heat stabilizers, light stabilizers, UV screeners, UV absorbers, flame retardants, anti-drip agents, flow aids, plasticizers, ester interchange inhibitors, antistatic agents, mold release agents, impact modifiers, fillers and colorants such as metal flakes, glass flakes and beads, ceramic particles, other polymer particles, dyes and pigments which may be organic, inorganic or organometallic.

In a particular embodiment a layer further comprises at least one colorant. In another particular embodiment a layer comprises both a bisphenol A polycarbonate and at least one colorant selected from the group consisting of dyes, pigments, glass flakes, and metal flakes. In a particular embodiment metal flake comprises aluminum flake. In another particular embodiment metal flake comprises aluminum flake which has dimensions of about 20–70 microns. Further examples of colorants include, but are not limited to, Solvent Yellow 93, Solvent Yellow 163, Solvent Yellow 114/Disperse Yellow 54, Solvent Violet 36, Solvent Violet 13, Solvent Red 195, Solvent Red 179, Solvent Red 135, Solvent Orange 60, Solvent Green 3, Solvent Blue 97, Solvent Blue 104, Solvent Blue 104, Solvent Blue 101, Macrolex Yellow E2R, Disperse Yellow 201, Disperse Red 60, Diaresin Red K, Colorplast Red LB, Pigment Yellow 183, Pigment Yellow 138, Pigment Yellow 110, Pigment Violet 29, Pigment Red 209, Pigment Red 209, Pigment Red 202, Pigment Red 178, Pigment Red 149, Pigment Red 122, Pigment Orange 68, Pigment Green 7, Pigment Green 36, Pigment Blue 60, Pigment Blue 15:4, Pigment Blue 15:3, Pigment Yellow 53, Pigment Yellow 184, Pigment Yellow 119, Pigment White 6, Pigment Red 101, Pigment Green 50, Pigment Green 17, Pigment Brown 24, Pigment Blue 29, Pigment Blue 28, Pigment Black 7, lead molybdates, lead chromates, cerium sulfides, cadmium sulfoselenide, and cadmium sulfide. Illustrative extending and reinforcing fillers include, but are not limited to, silica, silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers.

In another embodiment the present invention provides methods for making multilayer articles comprising the layer components described herein. In some embodiments the layer comprising the tielayer and a layer comprising either the polycarbonate or the polypropylene are formed into a pre-assembly (sometimes referred to as a film pre-assembly) comprising at least two layers: either a tie layer-polycarbonate layer pre-assembly or a tielayer-polypropylene layer pre-assembly. The multilayer article is then formed by subsequently fabricating, for example by laminating, the said pre-assembly with either the polycarbonate layer or the polypropylene layer, as appropriate, onto the tielayer side. In another embodiment the multilayer article may be made by combining polycarbonate and polypropylene layers with intervening tielayer in essentially one step. Both the multilayer article and the pre-assembly can be fabricated by known methods. In some particular embodiments the multilayer article or the pre-assembly or both can be fabricated by one or more steps of coextrusion of films or sheets of the materials, lamination, extrusion coating lamination, injection molding; e.g., in-mold decoration, or solvent or melt coating. In some particular embodiments application of any layer to any other layer is performed in the melt. In other particular embodiments the multilayer article or the pre-assembly or both may be fabricated by such illustrative methods as molding, compression molding, thermoforming, co-injection molding, overmolding, vacuum molding, hydroforming, multi-shot injection molding, sheet molding. These operations may be conducted under art-recognized conditions. In some embodiments of the invention a multilayer article comprising tielayer, polycarbonate layer and polypropylene layer is assembled and then subjected to at least one further fabrication step, for example at least one of those described herein.

Pre-assemblies comprising tielayer and any second layer may comprise the combined thicknesses of the layers. Such a preassembly has a thickness in various embodiments in a range of between about 10 microns and about 5,000 microns; or in a range between about 10 microns and about 2,000 microns; in another embodiment in a range of about 20–1,000 microns, in another embodiment in a range of about 20–750 microns, in another embodiment in a range of about 40–600 microns, in another embodiment in a range of about 40–500 microns and in another embodiment in a range of about 50–300 microns.

The multilayer articles comprising the various layer components of this invention are typically characterized by the usual beneficial properties of the polycarbonate layer and the polypropylene layer as may be evidenced by such properties as improved initial gloss, improved initial color, improved impact strength, resistance to staining in contact with such materials as foods and resistance to organic solvents encountered in their final applications. It is contemplated that the multilayer articles may possess recycling capability, which makes it possible to employ the regrind material as a substrate for further production of articles of the invention. The multilayer articles may also possess excellent environmental stability, for example thermal and hydrolytic stability.

Multilayer articles which can be made which comprise the various layer components of this invention include food service containers; articles for OVAD applications; exterior and interior components for aircraft, automotive, truck, military vehicle (including automotive, aircraft, and waterborne vehicles), scooter, and motorcycle, including panels, quarter panels, rocker panels, vertical panels, horizontal panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; laptop computer housings; palm-held computer housings; monitor housings; printer housings; keyboards; FAX machine housings; copier housings; telephone housings; phone bezels; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples the polycarbonate-polypropylene film assembly comprised a layer of polycarbonate with carbonate structural units derived from bisphenol A, and a layer of polypropylene. LEXAN was a bisphenol A polycarbonate obtained from General Electric Plastics. An elastomeric S-S/B-S block copolymer, STYROFLEX BX6105 (referred to hereinafter as STYROFLEX) was obtained from BASF Corporation. HYBRAR H7125, obtained from Kuraray Co., was a hydrogenated block copolymer comprising polystyrene end blocks and a vinyl bonded, polyisoprene-rich middle block. KURAMIRON TU-HM45395 resin, obtained from Kuraray Co., was a block copolymer comprising a polyester-type thermoplastic polyurethane (TPU) block and a hydrogenated block copolymer comprising polystyrene end blocks and a vinyl bonded, polyisoprene-rich middle block. The specific TPU used in KURAMIRON TU-HM45395 is KURAMIRON 8165, also made by Kuraray Co.

Polypropylene homopolymer PP1120 (referred to hereinafter as PP-1) was obtained from GE Polymerland. OREVAC sPP SM7-001 (referred to hereinafter as PP-2) was obtained from AtoFina, and was a chemically functionalized syndiotactic polypropylene (sPP) with a medium content of chemically incorporated maleic anhydride (about 0.4% by weight). ESCORENE PP8224 (referred to hereinafter as PP-3) was an impact copolymer comprising polypropylene structural units and was obtained from ExxonMobil. Aristech TR 3020C PP polypropylene (referred to hereinafter as PP-4) was obtained from Aristech Chemical Corp (now Sunoco Inc). A random propylene copolymer grade 13M11A PP (referred to hereinafter as PP-5) was obtained from Huntsman LLC.

Test samples of multilayer articles were cut into one-inch (2.54 centimeters) wide stripes and tested for peel resistance of the adhesive bond using a 90-degree peel test with a crosshead separation speed of one inch (2.54 centimeters) per minute using an Instron testing device (Model 4505). This adhesion test method is well known to those skilled in the art and is generally described in such references as U.S. Pat. No. 3,965,057. The testing apparatus in this test procedure consisted of a series of movable rollers or supports which allowed the test specimen to be peeled at a constant 90-degree angle along its entire uncut length. The apparatus consisted of a series of five 0.5 inch (1.27 centimeter) rollers which were geometrically affixed to two side supports and a base plate. The two lower rollers were adjustable so that the apparatus could accommodate test specimens varying in thickness. A suitable top clamp was used for securing the plastic layer. The test specimen was 6 inches (15.24 centimeters) in length and 1 inch (2.54 centimeters) in width. It was ensured that a portion of the test specimen remained unbonded. At least 3 specimens were tested for each adhesive sample. In the actual testing procedure, the fixture was affixed to the movable head of the testing machine in a position which would cause the peeled plastic layer to form a 90-degree angle with the test specimen during the test. The test specimen was positioned in the fixture and the free skin clamped securely. The clamp was then pinned to the top head of the testing machine. With no load on the test specimen, the weighing apparatus was then balanced to zero. Provision was made to autograph the peel load versus displacement of the head for a peel distance of at least 4 inches (10.2 centimeters). Neglecting the first inch (2.54 centimeters) of peel, the load required to peel the plastic layer was taken from the autographic curve. The peel strength (P) was then calculated as follows:

$$P = \frac{\text{peeling load (Newtons)}}{\text{width of specimen (meters)}}.$$

In addition, certain test specimens were evaluated using a 180-degree T-peel test performed according to ASTM D1876.

EXAMPLE 1

Laminates of STYROFLEX onto polycarbonate (PC): A 20 mil×3.5 inch×4 inch (0.05 centimeters (cm)×8.9 cm×10.2 cm) bisphenol A PC film was placed in the 3/16 inch×4 inch×4 inch plaque mold (0.48 cm×10.2 cm×10.2 cm). STYROFLEX was injection molded behind the PC film. The film was well-adhered to the polycarbonate substrate. The 90 degree peel strength was found to be about 18,385 Newtons per linear meter.

EXAMPLES 2–4

Laminates of STYROFLEX onto various polypropylenes: A 1/16 inch×3.5 inch×4 inch (0.16 cm×8.9 cm×10.2 cm) STYROFLEX film was placed in a 3/16 inch×4 inch×4 inch (0.48 cm×10.2 cm×10.2 cm) plaque mold, and polypropylene resins were injection molded behind the STYROFLEX film. The film was well-adhered to the polypropylene substrates. Table 1 shows peel strength values and apparent failure modes for the laminates.

TABLE 1

| Example | Substrate | Peel Strength (Newtons per linear meter) | Apparent failure mode |
| --- | --- | --- | --- |
| 2 | PP-1 | 8265 | Interfacial |
| 3 | PP-1 | 2556 | Interfacial |
| 4 | PP-3 | 3520 | Interfacial |

EXAMPLES 5–7

Laminates of HYBRAR onto various substrates by in-mold decoration (IMD) process: Films of HYBRAR H7125 (refereed to hereinafter as HYBRAR) with dimensions 1/16 inch×4 inch×6 inch (0.16 cm×10.2 cm×15.2 cm) were made by an injection molding process. The HYBRAR film was placed in the cavity of the mold, and PP-2, PP-3, or a LEXAN 141 polycarbonate resin was injection molded behind the HYBRAR film. The HYBRAR film was found to adhere well to the various substrates. The 90-degree peel strength is shown in Table 2. In all cases, the peel arm was continuously stretched and no delamination was observed.

TABLE 2

| Example | Material | Peel Strength (Newtons per linear meter) | Apparent failure mode |
| --- | --- | --- | --- |
| 5 | PP-1 | 3450 | Peel arm stretch, no delamination |
| 6 | PP-2 | 3047 | Peel arm stretch, no delamination |
| 7 | LEXAN | 2977 | Peel arm stretch, no delamination |

EXAMPLE 8–11

Preparation of PC/tielayer/PP films by co-extrusion and lamination: Polypropylene/HYBRAR and polypropylene/STYROFLEX films in 15-mil/5-mil (0.38 mm/0.13 mm) thickness ratio, respectively, were prepared using film coextrusion equipment. The setup consisted of a 1.5 inch (3.81 cm) diameter single screw extruder, a 0.75 inch (1.9 cm) diameter single screw extruder, a feed block to receive output from both extruders, an 8 inch (20.3 cm) wide single manifold film die, and a roll-stack take-up device. A typical extrusion temperature set profile for the three extruder heating zones was 177, 204, and 204° C. for both extruders; the feed block and die were both set at 204° C. The extruders were set at 50 to 75 rpm, and the total rate was set at 7.25 to 9.1 kilograms per hour. Four PP/tielayer films (PP-4/HYBRAR, PP-4/STYROFLEX, PP-5/HYBRAR, and PP-5/STYROFLEX) were prepared. The co-extruded films were found to have good uniformity and surface quality. The co-extruded films were subsequently laminated with a 15 mil (0.381 mm) PC film at 135° C. and 1.38 megapascals for 3 minutes using a hot press. The tielayer side was toward the polycarbonate. The adhesion strength was measured by T-peel test as described in ASTM D1876. The final three-layer films were found to have excellent aesthetic quality. Table 3 shows peel strength values and apparent failure modes for the laminates.

TABLE 3

| Example | Material | Peel Strength (Newtons per linear meter) | Apparent failure mode |
| --- | --- | --- | --- |
| 8 | PP-4/HYBRAR/PC | 2960 | PC/tielayer interfacial |
| 9 | PP-5/HYBRAR/PC | 2767 | PC/tielayer interfacial |
| 10 | PP-4/STYROFLEX/PC | 818 | PP/tielayer and PC/tielayer interfacial |
| 11 | PP-5/STYROFLEX/PC | 629 | PP/tielayer and PC/tielayer interfacial |

EXAMPLE 12

Making of PC/tielayer/PP films by lamination. 10 mil (0.254 millimeters) PC film (LEXAN 141) was obtained from GE Plastics; 10 mil (0.254 millimeters) HYBRAR film and 10 mil (0.254 millimeters) PP film (made from PP-4)

were made using a 16 mm corotating twin-screw extruder equipped with a 10.2 centimeter wide film die. A 30 mil (0.762 millimeter) film of PC/HYBRAR/PP were made by laminating PC, HYBRAR and PP films at 135° C. under 0.69 megapascals for 2 minutes. The film showed excellent adhesion. 180 degree T-peel test at 1 inch (2.54 cm) per minute peel rate showed that the peel strength was 2347 Newtons per linear meter. The apparent failure mode was interfacial failure between PC and HYBRAR.

EXAMPLES 13–14

Laminates of HYBRAR-TPU copolymer onto various substrates by in-mold decoration (IMD) process: Films of KURAMIRON TU-HM45395 (sometimes referred to herein as HYBRAR-TPU copolymer) with dimensions 1/16 inch×4 inch×6 inch (0.16 cm×10.2 cm×15.2 cm) were made by an injection molding process. The HYBRAR-TPU copolymer film was placed in the cavity of the mold, and PP-3 or PP-5 substrate was injection molded behind the film. The film was found to adhere well to the various substrates. Since the adhesion strength exceeded the elongation strength in all cases, the peel arm was reinforced with an adhesive tape backing. The 90 degree peel strength values are shown in Table 4. In all cases, the peel arm was stretched and no delamination was observed.

TABLE 4

| Example | Material | Peel Strength (Newtons per linear meter) | Apparent failure mode |
| --- | --- | --- | --- |
| 13 | PP-3 | 7224 | Peel arm stretch, no delamination |
| 14 | PP-5 | 6489 | Peel arm stretch, no delamination |

EXAMPLE 15

Laminate of PC onto HYBRAR-TPU by in-mold decoration (IMD) process. LEXAN polycarbonate films 20 mils (0.5 mm) thick were obtained from GE Plastics and were cut into pieces 4 inch×6 inch (10.2 cm×15.2 cm) in dimension. The PC film was placed in the cavity of the mold, and HYBRAR-TPU was injection molded behind the PC film. The PC film was found to adhere well to the HYBRAR-TPU. The 180 degree T-peel strength test showed a value of 7066 Newtons per linear meter and the failure mode was the stretch of the peel arm and the cohesive failure of HYBRAR-TPU.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents cited herein are incorporated herein by reference.

What is claimed is:

1. A multilayer article comprising (i) at least one polycarbonate layer, wherein the polycarbonate comprises structural units derived from at least one dihydroxy aromatic hydrocarbon; (ii) at least one polypropylene layer; and (iii) a tielayer between the polycarbonate layer and the polypropylene layer, wherein the tielayer comprises a copolymer with structural units derived from at least one alkenyl aromatic compound and at least one conjugated diene.

2. The multilayer article of claim 1 wherein the dihydroxy aromatic hydrocarbon comprises those represented by the formula (I):

wherein D is a divalent aromatic radical with the structure of formula (II):

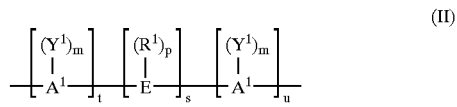

wherein $A^1$ is selected from the group consisting of an aromatic group, phenylene, biphenylene and naphthylene;

E is selected from the group consisting of alkylene, alkylidene, methylene, ethylene, ethylidene, propylene, propylidene, isopropylidene, butylene, butylidene, isobutylidene, amylene, amylidene, isoamylidene, a cycloaliphatic group, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; a sulfur-containing linkage, sulfide, sulfoxide, sulfone; a phosphorus-containing linkage, phosphinyl, phosphonyl; an ether linkage; a carbonyl group; a tertiary nitrogen group; a silicon-containing linkage, silane, siloxy; and two or more alkylene or alkylidene groups connected by a moiety different from alkylene or alkylidene and selected from the group consisting of an aromatic linkage; a tertiary nitrogen linkage; an ether linkage; a carbonyl linkage; a silicon-containing linkage, silane, siloxy; a sulfur-containing linkage, sulfide, sulfoxide, sulfone; a phosphorus-containing linkage, phosphinyl and phosphonyl;

$R^1$ independently at each occurrence is selected from the group consisting of a monovalent hydrocarbon group, alkenyl, allyl, alkyl, aryl, aralkyl, alkaryl, cycloalkyl, a halogen-substituted monovalent hydrocarbon group, a fluoro-substituted monovalent hydrocarbon group, a chloro-substituted monovalent hydrocarbon group, dichloroalkylidene, and gem-dichloroalkylidene, $Y^1$ independently at each occurrence is selected from the group consisting of an inorganic atom, halogen, fluorine, bromine, chlorine, iodine; an inorganic group containing more than one inorganic atom, nitro; an organic group, a monovalent hydrocarbon group, alkenyl, allyl, alkyl, $C_1$–$C_6$ alkyl, aryl, aralkyl, alkaryl, cycloalkyl, and an oxy group, $OR^2$ wherein $R^2$ is a monovalent hydrocarbon group selected from the group consisting of alkyl, aryl, aralkyl, alkaryl, cycloalkyl;

"m" represents any integer from and including zero through the number of replaceable hydrogens on $A^1$ available for substitution;

"p" represents an integer from and including zero through the number of replaceable hydrogens on E available for substitution;

"t" represents an integer equal to at least one;

"s" represents an integer equal to either zero or one; and

"u" represents any integer including zero.

3. The multilayer article of claim 1 wherein the dihydroxy aromatic hydrocarbon comprises bis(4-hydroxyphenyl) sulfide, bis(4-hydroxyphenyl) ether, bis(4-hydroxyphenyl) sulfone, bis(4-hydroxyphenyl)sulfoxide, 1,4-dihydroxybenzene, 4,4'-oxydiphenol, 2,2-bis(4-hydroxyphenyl)hexafluoropropane, 4,4'-(3,3,5-trimethylcyclohexylidene)diphenol; 4,4'-bis(3,5-dimethyl) diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl) propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl) cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; $C_{1-3}$ alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl) propane; bis(3,5-methylphenyl-4-hydroxyphenyl)methane; 1,1-bis(3,5-dimethylphenyl-4-hydroxyphenyl)ethane; 2,2-bis(3,5-dimethylphenyl-4-hydroxyphenyl)propane; 2,4-bis (3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl) sulfoxide, bis(3,5-dimethyl-4-hydroxyphenyl) sulfone, bis(3,5-dimethylphenyl-4-hydroxyphenyl)sulfide; or mixtures comprising at least one of the foregoing dihydroxy-aromatic compounds.

4. The multilayer article of claim 3 wherein the dihydroxy aromatic hydrocarbon comprises bisphenol A.

5. The multilayer article of claim 1 wherein the polycarbonate layer has a thickness in a range of about 10–2,500 microns.

6. The multilayer article of claim 1 wherein the polycarbonate layer further comprises at least one colorant selected from the group consisting of dyes, pigments, metal flakes, and glass flakes.

7. The multilayer article of claim 1 wherein the polypropylene layer comprises at least one polypropylene selected from the group consisting of homopolypropylene; random, graft, and block copolymers comprising structural units derived from propylene and further comprising up to about 30 weight percent of units derived from $C_2$–$C_{10}$ aliphatic alpha-olefins or $C_2$–$C_{10}$ aromatic alpha-olefins, polypropylenes which have been chemically modified with at least one polar functionalization agent selected from the group consisting of acrylic acid, methacrylic acid, maleic acid, maleic anhydride, itaconic acid, itaconic anhydride, fumaric acid, malic acid and monoesters of maleic acid and fumaric acid with monohydric alcohols; and a blend of at least two of these polypropylenes.

8. The multilayer article of claim 1 wherein the polypropylene layer comprises at least one polypropylene selected from the group consisting of homopolypropylene; and polypropylenes which have been chemically modified with at least one polar functionalization agent selected from the group consisting of acrylic acid and maleic anhydride.

9. The multilayer article of claim 1 wherein the polypropylene layer has a thickness in a range of about 10–2,500 microns.

10. The multilayer article of claim 1 wherein the polypropylene layer further comprises at least one colorant selected from the group consisting of dyes, pigments, metal flakes, and glass flakes.

11. The multilayer article of claim 1 wherein the tielayer copolymer comprises structural units derived from styrene and isoprene.

12. The multilayer article of claim 11 wherein the tielayer copolymer further comprises at least one polyurethane block.

13. The multilayer article of claim 11 wherein the tielayer copolymer comprises at least about 50% of the isoprene linkages as 1,2 or 3,4 linkages.

14. The multilayer article of claim 11 wherein the tielayer copolymer comprises greater than about 10% and less than about 30% units derived from styrene.

15. The multilayer article of claim 1 wherein the tielayer copolymer comprises structural units which have been hydrogenated.

16. The multilayer article of claim 1 wherein the tielayer copolymer comprises structural units derived from styrene and butadiene.

17. The multilayer article of claim 1 wherein the tielayer comprises at least one member selected from the group consisting of polystyrene-b-poly(styrene-butadiene)-b-polystyrene (S-S/B-S) block copolymers; hydrogenated polystyrene-b-poly(isoprene)-b-polystyrene (S-I-S) block copolymers; a blend of an S-S/B-S block copolymer with a polycarbonate; a blend of an S-S/B-S block copolymer with a polypropylene, a blend of an S-S/B-S block copolymer with both polycarbonate and polypropylene; a blend of a hydrogenated S-I-S block copolymer with a polycarbonate; a blend of a hydrogenated S-I-S block copolymer with a polypropylene, and a blend of a hydrogenated S-I-S block copolymer with both polycarbonate and polypropylene.

18. The multilayer article of claim 1 wherein the tielayer has a thickness in a range of about 10–250 microns.

19. The multilayer article of claim 1 wherein test parts of the multilayer article exhibits a ninety-degree peel strength of at least 600 Newtons per meter.

20. The multilayer article of claim 19 wherein test parts of the multilayer article exhibits a ninety-degree peel strength of at least 2500 Newtons per meter.

21. The multilayer article of claim 1 which is a food service container, an article for OVAD applications; an exterior or interior component for aircraft, automotive, truck, military vehicle, water-borne vehicle, scooter, or motorcycle, including panels, quarter panels, rocker panels, vertical panels, horizontal panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; an enclosure, housing, panel, or part for an outdoor vehicle or device; an enclosure for an electrical or telecommunication device; an article of outdoor furniture; an aircraft component; an exterior or interior component for a boat or marine equipment, including trim, enclosures, or housings; an outboard motor housing; a depth finder housing; an exterior or interior component for a personal water-craft or jet-ski; an exterior or interior component for a pool, spa or hot-tub; a step or step covering; an exterior or interior component for a building or construction application including glazing, roofs, windows, floors, decorative window furnishings or treatments; a wall panel; a door or door covering; a counter top; an enclosure, housing, panel, or part for an automatic teller machine; an enclosure, housing, panel, or part for a lawn or garden tractor, lawn mower, or a tool, including a lawn and garden tool; window or door trim; an exterior or interior component for an article of sports equipment or a toy; an enclosure, housing, panel, or part for a snowmobile or recreational vehicle; an article of playground equipment; an article made from plastic-wood combinations; a golf course marker; a utility pit cover; a computer housing, a desk-top computer housing; a portable computer housing, a lap-top computer housing, a palm-held computer housing, a monitor housing, a printer housing; a keyboard or keyboard housing, a FAX machine housing, a copier housing, a telephone housing; a phone bezel; a mobile phone housing; a radio sender housing; a radio receiver housing; a network interface device housing; a transformer housing; an air conditioner housing; cladding or seating for public transportation; cladding or seating for trains, subways, or buses; a meter housing; an antenna housing; cladding for satellite dishes; coated helmets or personal protective equipment; coated synthetic or natural textiles; or coated foam article.

22. A multilayer article consisting essentially of three layers: (i) a bisphenol A polycarbonate-comprising layer; (ii) a polypropylene-comprising layer; and (iii) a tielayer between the polycarbonate layer and the polypropylene layer, wherein the tielayer is either (A) a hydrogenated block copolymer comprising structural units derived from styrene and isoprene, wherein at least about 50% of the isoprene linkages are 1,2 or 3,4 linkages and wherein greater than about 10% and less than about 30% of structural units are derived from styrene; or (B) a polystyrene-b-poly(styrene-butadiene)-b-polystyrene block copolymer; and wherein the multilayer article exhibits a ninety-degree peel strength of at least 600 Newtons per meter.

23. The multilayer article of claim 22 wherein the hydrogenated block copolymer comprising structural units derived from styrene and isoprene further comprises at least one polyurethane block.

24. The multilayer article of claim 22 which is a food service container.

25. A film pre-assembly comprising (i) at least one polycarbonate layer, wherein the polycarbonate comprises structural units derived from at least one dihydroxy aromatic hydrocarbon; and (iii) a tielayer comprising a copolymer with structural units derived from at least one alkenyl aromatic compound and at least one conjugated diene.

26. The film pre-assembly of claim 25 wherein the dihydroxy aromatic hydrocarbon comprises bisphenol A.

27. The film pre-assembly of claim 25 wherein the tielayer is either (A) a hydrogenated block copolymer comprising structural units derived from styrene and isoprene, wherein at least about 50% of the isoprene linkages are 1,2 or 3,4 linkages and wherein greater than about 10% and less than about 30% of structural units are derived from styrene; or (B) a polystyrene-b-poly(styrene-butadiene)-b-polystyrene block copolymer.

28. The film pre-assembly of claim 27 wherein the hydrogenated block copolymer comprising structural units derived from styrene and isoprene further comprises at least one polyurethane block.

29. The film pre-assembly of claim 25 wherein thicknesses of layers are: a polycarbonate layer of about 10–2,500 microns; and a tielayer of about 10–250 microns.

30. A film pre-assembly comprising (ii) at least one polypropylene layer; and (iii) a tielayer comprising a copolymer with structural units derived from at least one alkenyl aromatic compound and at least one conjugated diene.

31. The film pre-assembly of claim 30 wherein the tielayer is either (A) a hydrogenated block copolymer comprising structural units derived from styrene and isoprene, wherein at least about 50% of the isoprene linkages are 1,2 or 3,4 linkages and wherein greater than about 10% and less than about 30% of structural units are derived from styrene; or (B) a polystyrene-b-poly(styrene-butadiene)-b-polystyrene block copolymer.

32. The film pre-assembly of claim 31 wherein the hydrogenated block copolymer comprising structural units derived from styrene and isoprene further comprises at least one polyurethane block.

33. The film pre-assembly of claim 31 wherein thicknesses of layers are: a polypropylene layer of about 10–2,500 microns; and a tielayer of about 10–250 microns.

34. A method for making a multilayer article comprising (i) at least one polycarbonate layer, wherein the polycarbonate comprises structural units derived from at least one dihydroxy aromatic hydrocarbon; (ii) at least one polypropylene layer; and (iii) a tielayer between the polycarbonate layer and the polypropylene layer, wherein the tielayer comprises a copolymer with structural units derived from at least one alkenyl aromatic compound and at least one conjugated diene;

which method comprises the steps of (a) preparing a pre-assembly of polycarbonate layer and tielayer, and (b) forming said article with the tielayer side of the pre-assembly adjacent to the polypropylene layer.

35. The method of claim 34 wherein the dihydroxy aromatic hydrocarbon comprises bisphenol A.

36. The method of claim 34 wherein the tielayer is either (A) a hydrogenated block copolymer comprising structural units derived from styrene and isoprene, wherein at least about 50% of the isoprene linkages are 1,2 or 3,4 linkages and wherein greater than about 10% and less than about 30% of structural units are derived from styrene; or (B) a polystyrene-b-poly(styrene-butadiene)-b-polystyrene block copolymer.

37. The method of claim 36 wherein the hydrogenated block copolymer comprising structural units derived from styrene and isoprene further comprises at least one polyurethane block.

38. The method of claim 34 wherein the pre-assembly of polycarbonate layer and tielayer is formed by coextrusion.

39. The method of claim 34 wherein step (b) is performed by coextrusion or lamination.

40. A method for making a multilayer article comprising (i) at least one polycarbonate layer, wherein the polycarbonate comprises structural units derived from at least one dihydroxy aromatic hydrocarbon; (ii) at least one polypropylene layer; and (iii) a tielayer between the polycarbonate layer and the polypropylene layer, wherein the tielayer comprises a copolymer with structural units derived from at least one alkenyl aromatic compound and at least one conjugated diene;

which method comprises the steps of (a) preparing a pre-assembly of polypropylene layer and tielayer, and (b) forming said article with the tielayer side of the pre-assembly adjacent to the polycarbonate layer.

41. The method of claim 40 wherein the dihydroxy aromatic hydrocarbon comprises bisphenol A.

42. The method of claim 40 wherein the tielayer is either (A) a hydrogenated block copolymer comprising structural units derived from styrene and, isoprene, wherein at least about 50% of the isoprene linkages are 1,2 or 3,4 linkages and wherein greater than about 10% and less than about 30% of structural units are derived from styrene; or (B) a polystyrene-b-poly(styrene-butadiene)-b-polystyrene block copolymer.

43. The method of claim 42 wherein the hydrogenated block copolymer comprising structural units derived from styrene and isoprene further comprises at least one polyurethane block.

44. The method of claim 40 wherein the pre-assembly of polypropylene layer and tielayer is formed by coextrusion.

45. The method of claim 40 wherein step (b) is performed by coextrusion or lamination.

46. A method for making a multilayer article consisting essentially of three layers (i) at least one polycarbonate layer, wherein the polycarbonate comprises structural units derived from at least one dihydroxy aromatic hydrocarbon; (ii) at least one polypropylene layer; and (iii) a tielayer between the polycarbonate layer and the polypropylene layer, wherein the tielayer comprises a copolymer with structural units derived from at least one alkenyl aromatic compound and at least one conjugated diene;

which method comprises the step of forming the article by coextrusion, lamination or extrusion coating lamination.

47. The method of claim 46 wherein the dihydroxy aromatic hydrocarbon comprises bisphenol A.

48. The method of claim 46 wherein the tielayer is either (A) a hydrogenated block copolymer comprising structural units derived from styrene and isoprene, wherein at least about 50% of the isoprene linkages are 1,2 or 3,4 linkages and wherein greater than about 10% and less than about 30% of structural units are derived from styrene; or (B) a polystyrene-b-poly(styrene-butadiene)-b-polystyrene block copolymer.

49. The method of claim 48 wherein the hydrogenated block copolymer comprising structural units derived from styrene and isoprene further comprises at least one polyurethane block.

* * * * *